United States Patent [19]
Fortsch

[11] 3,883,929
[45] May 20, 1975

[54] CABLE CLAMP ASSEMBLY

[75] Inventor: William A. Fortsch, Livingston, N.J.

[73] Assignee: Thomas & Betts Corporation, Elizabeth, N.J.

[22] Filed: Sept. 10, 1973

[21] Appl. No.: 396,098

[52] U.S. Cl.............. 24/132 R; 24/262; 24/254; 269/131
[51] Int. Cl.[2] ............... F16G 11/00; A44B 21/00
[58] Field of Search...... 24/262, 132 R, 254, 249 R, 24/249 PP, 81 CC; 211/68; 269/131; 81/57.17

[56] References Cited
UNITED STATES PATENTS

| | | | |
|---|---|---|---|
| 502,033 | 7/1893 | Christ | 24/254 |
| 844,305 | 2/1907 | Epler | 24/254 |
| 1,128,593 | 2/1915 | Fort | 24/254 |
| 2,427,365 | 9/1947 | Meister | 24/262 R |
| 2,523,159 | 9/1950 | Stone | 81/57.17 |
| 2,746,329 | 5/1956 | Paget | 81/57.17 |
| 2,904,747 | 9/1959 | Skwarek | 24/254 |
| 3,149,390 | 9/1964 | McCoy | 24/262 R |
| 3,627,300 | 12/1971 | Caveney | 248/68 R |
| 3,799,010 | 3/1974 | Guier | 81/57.17 |

Primary Examiner—Bernard A. Gelak
Attorney, Agent, or Firm—David Teschner; Jesse Woldman

[57] ABSTRACT

A cable clamp assembly comprises an elastomeric strip spanning the space between opposing ends of a pair of upstanding supports extending from the base portion of a frame member to which are pivotingly attached a pair of selectively contoured opposing arms resiliently biased towards one another and generally encompassing the space between the upstanding supports. The arms are arranged to be cammed apart and pivot outwardly away from the supports to provide access to the elastomeric strip which provides a cradle for a wire bundle or the like inserted between the arms and engaged by the elastomeric strip. Means for biasing the arms may include, for example, either a compression spring coupled between the lower portion of the arms, a cantilever spring arrangement fastened either to the lower portions of the arms or to the frame member and engaging the lower portion of the arms or, in a further embodiment, a torsion spring coupled to each arm adjacent the pivot point thereof. The upper portion of each arm has a convexedly contoured exterior surface to selectively direct the camming forces directed thereagainst.

17 Claims, 11 Drawing Figures

CABLE CLAMP ASSEMBLY

BACKGROUND OF THE INVENTION

1. Field of the Invention

The invention is directed to the field of clamping devices and principally to a self-adjusting cable clamp assembly.

2. Description of the Prior Art

Prior art cable clamps fall generally into two categories comprising, firstly, those having fixed openings designed primarily for a particular sized cable, and secondly, cable clamp devices having variable openings whereby the user may adjust the size of the opening by selecting a particular point of closure between the opposing cable encircling members of the clamp. In the former case, the user was required to have readily available a wide range of cable clamps to accommodate the various cable sizes encountered in normal practice. In the event that an improperly sized cable clamp was employed, the cable was either too tightly compressed within the jaws of the clamp possibly causing severe damage to the cable, or the cable was too loosely retained therein to provide adequate retention and stability. With the latter devices, the user was required to carefully adjust the clamp in such manner as to provide the proper engagement about the cable. In either case, the assembly was relatively permanent and, accordingly, unsuited for use in applications where rapid assembly and disassembly was required. In many wiring applications, there has been a great need for a cable clamp which will readily accept a relatively wide range of wire bundle sizes, while permitting the wire bundle to be rapidly inserted and removed therefrom by a simple manipulation, where, for example, the clamps are employed on a wire harness board or the like. A recent prior art selfadjusting cable clamp is disclosed in U.S. Pat. No. 3,627,300, issued Dec. 14, 1971 to Caveney. This device incorporates an elastomeric strip or band wound in relatively complex fashion about a pair of pivoting arms attached to a frame member. The arms are arranged to pivot inwardly towards the cable receiving area to expose the elastomeric strip as one or more wires of a cable are forced thereagainst and are thus caused to enter and interfere with the available cable receiving area, thereby limiting the effectiveness and versatility of the clamp.

SUMMARY OF THE INVENTION

The invention overcomes the problems and limitations noted above with respect to the prior art devices by providing a self-adjusting cable clamp assembly which is simpler, more versatile, and more convenient than such prior art devices. A frame member includes a pair of upstanding supports in spaced relationship to define a cable receiving cavity therebetween. Straddling the free ends of the supports is an elastomeric strip selectively adapted to provide a cradle for one or more wires inserted therein. A pair of opposing jaw-like arms overlie the elastomeric strip and are pivotally attached to a base portion of the frame member and biased to a closed position. Clamping is effected simply and conveniently by urging one or more wires of a cable against the upper surface of the opposing jaws causing them to be cammed apart to provide access to the elastomeric strip which deforms about the wires to provide a cradle therefore while the arms close over the wires under the influence of the biasing means, thereby securely retaining the wires between the free ends of the jaws and the elastomeric strip. The arms are resiliently biased to their closed position by, in one embodiment, a compression spring interposed between the arms adjacent their lower portions. In other embodiments, the compression spring may be replaced by one or more flat spring arrangements adapted to effect a similar biasing force. In a further embodiment, the arms are urged towards one another by a torsion spring coupled between the arm and the frame member adjacent the pivot point thereof. The arms may at least partially straddle the support members or be offset therefrom either on one or both sides thereof. It is therefore an object of this invention to provide an improved cable clamp assembly.

It is another object of this invention to provide a self-adjusting cable clamp assembly.

It is a further object of this invention to provide an improved self-adjusting cable clamp assembly for wire harness boards and the like.

It is yet another object of this invention to provide an improved self-adjusting, cammingly operated cable clamp assembly.

It is still a further object of this invention to provide an improved self-adjusting cable clamp assembly in which a wire bundle is securely retained between an elastomeric strip and the inner surfaces of a pair of outwardly pivoting arms attached to the cable clamp frame member.

It is yet a further object of this invention to provide an improved self-adjusting cable clamp assembly in which a wire bundle is securely retained between an elastomeric strip and the inner surfaces of a pair of cammingly operable, outwardly pivoting arms attached to the cable clamp frame member.

Other objects and features of the invention will be pointed out in the following description and claims and illustrated in the accompanying drawings which disclose by way of example the principle of the invention and the best mode contemplated for carrying it out.

BRIEF DESCRIPTION OF THE DRAWINGS

In the Drawings.

Similar elements are given similar reference characters in each of the respective drawings.

DESCRIPTION OF THE PREFERRED EMBODIMENTS

Figure 6:
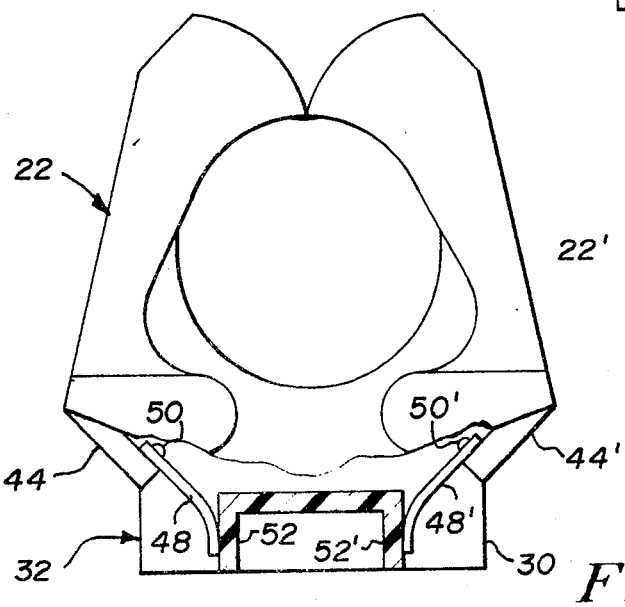
FIG. 6 is a front elevational view, partly cut away and partly in section, showing a further embodiment of the biasing means of a cable clamp assembly constructed in accordance with the concepts of the invention.
Figure 7:
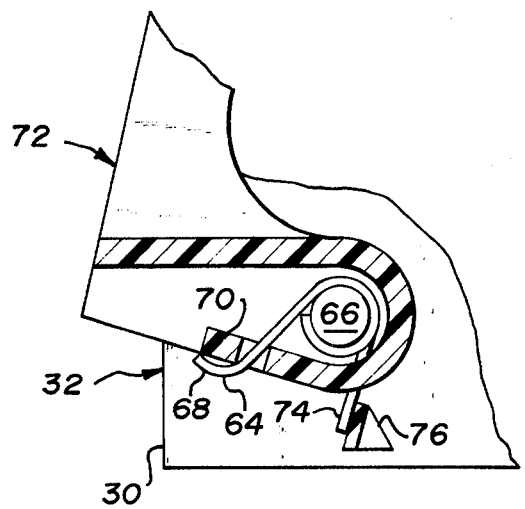
FIGS. 7 and 8 are fragmentary front elevational views, partly cut away and partly in section, of further embodiments of the biasing means of a cable clamp assembly constructed in accordance with the concepts of the invention.
Figure 8:
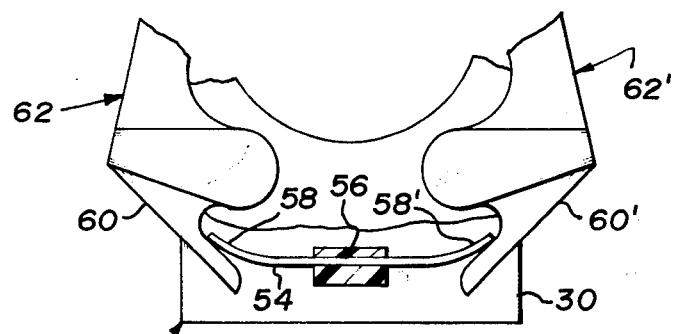

Turning now to FIGS. 1, 2, 3, 4 and 5 there is shown a cable clamp assembly 20 constructed in accordance with the concepts of the invention. The cable clamp assembly 20 comprises first and second arms 22 and 22' respectively, each having an upper portion 24, 24' respectively, and a lower portion 26, 26' respectively. The upper portions 24, 24' of arms 22, 22' respectively are each defined by a convexedly contoured exterior surface 23, 23' respectively. Each of the arms 22, 22' is pivotingly coupled, as at 28, 28' to a base portion 30 of a frame member 32. A pair of spaced supports 34, 34' extend upstandingly from the base portion 30 of the frame member 32. The arms 22, 22' have a generally U-shaped transverse cross section permitting the frame member supports 34, 34' to be effectively straddled by a portion of the arms 22, 22' and at least partially enclosed therewithin, as may be more clearly seen in FIG. 2. An elastomeric strip 36 extends between the frame member supports 34, 34' generally adjacent their free ends and, in the particular embodiment illustrated in FIG. 1, peripherally encompasses a cable receiving cavity 38 defined by the inner surfaces of the frame member support 34, 34' by positioning the elastomeric strip 36 within a channel-like guide 40 bounding the cable receiving cavity 38. The arms 22, 22' are maintained in a closed position, substantially as shown, by biasing means such as a compression spring 42 coupled between the lower portions 26, 26' of arms 22, 22' respectively. As clearly shown in FIG. 1, the lower portions 26, 26' of the arms 22, 22' respectively, each comprise an extending portion 44, 44' having a boss 46, 46' to which the ends of the spring 42 are coupled. The spring 42 is initially compressed and inserted between the bosses 46, 46' and allowed to expand slightly therebetween thus urging the lower portions 26, 26' of each of the arms 22, 22' outwardly about the pivots 28, 28', causing the arms 22, 22' to be rotatably biased towards one another in clamp-like fashion. To effect a similar biasing action an arrangement similar to that illustrated in FIG. 6 may be employed. As shown therein flat springs 48, 48' are connected as at 50, 50' to the extending portions 44, 44' of each of the arms 22, 22' respectively. The other end of the flat springs 48, 48' abut a pair of spaced surfaces 52, 52' extending within the base portion 30 of the frame member 32. The surfaces 52, 52' cooperate with the springs 48, 48' preferably to impart a slight deflection thereto to provide the necessary biasing action to maintain the arms 22, 22' in the closed position. As the arms 22, 22' are cammed open, the springs 48, 48' are caused to be increasingly deflected, thereby applying a counteracting torque against the arms 22, 22' to urge them back to their closed position, when the camming force is removed. The arrangement shown in FIG. 6 may be modified as shown, for example, in FIG. 8, where there is illustrated a cantilever spring 54 coupled generally intermediate its length within a slotted boss 56 attached to the base portion 30 of frame member 32. The spring 54 comprises a pair of free ends 58, 58' contacting selectively formed lower portion extensions 60, 60' of a pair of cable clamp assembly arms 62, 62'. The ends 58, 58' of the spring 54 are maintained in the upwardly deflected position substantially as shown, thereby providing a counteracting torque to each of the arms 62, 62' to cause them to be biased towards one another substantially as described heretofore. Alternatively, a biasing arrangement such as illustrated in FIG. 7 may be conveniently employed. A torsion spring 64 is positioned over a boss 66 coupled to or integral with the base portion 30 of frame member 32. One end 68 of the spring 64 engages a shoulder portion 70 of a cable clamp assembly arm 72 while the other end 74 of spring 64 engages a boss 76 extending within the base portion 30 of frame member 32. The spring 64 is pre-stressed in the assembled condition to impart selective bias to the arm 22. It will of course be readily appreciated that although only one of a pair of cable clamp assembly arms is illustrated in FIG. 7, a similar biasing arrangement is provided for the opposing arm not shown in FIG. 7.

Figure 1:
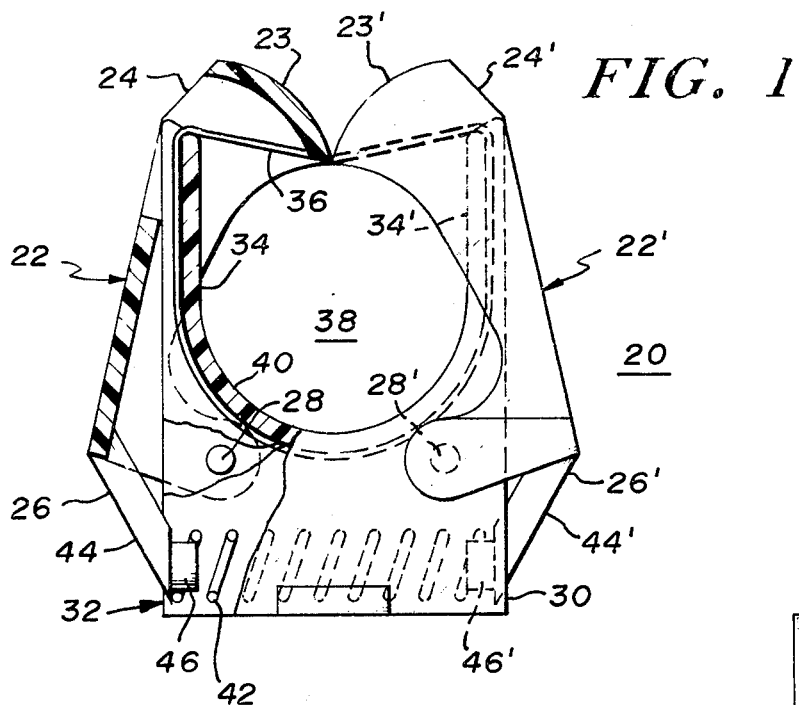
FIG. 1 is a front elevational view, partly cut away and partly in section, of a cable clamp assembly constructed in accordance with the concepts of the invention.
Figure 2:
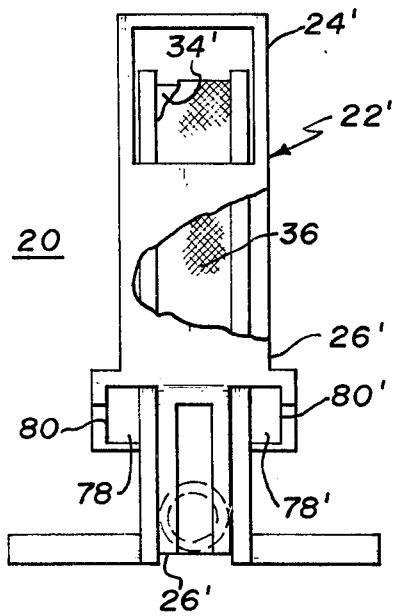
FIG. 2 is a side elevational view, partly cut away, of the device of FIG. 1.
Figure 3:
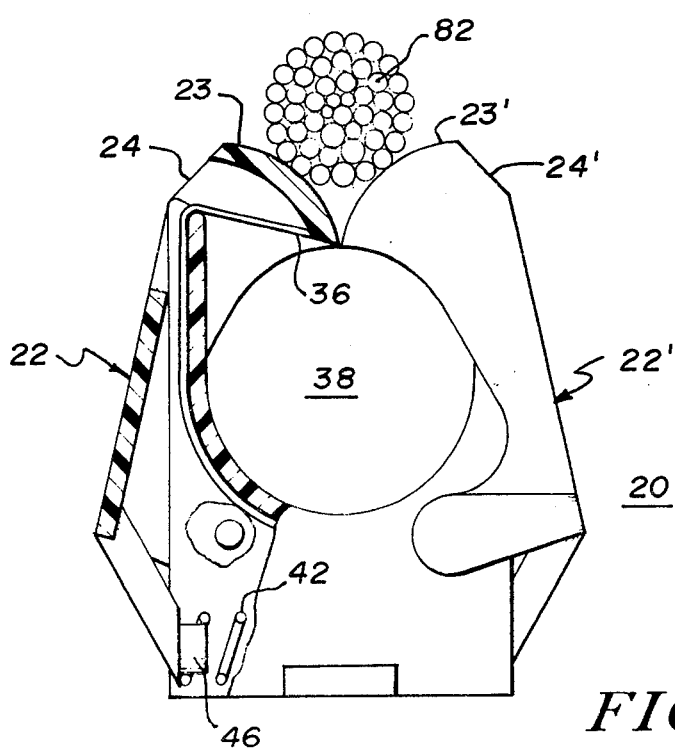
FIG. 3 is a front elevational view, partly in section and partly cut away, of the device of FIG. 1, illustrating the manner of inserting a bundle of wires thereinto.
Figure 4:
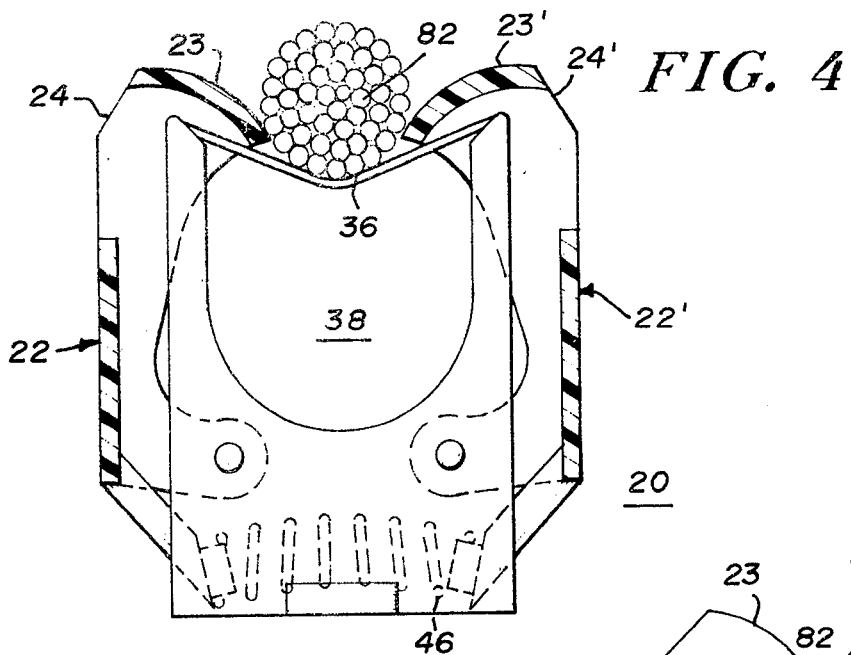
FIG. 4 is a front elevational view, partly in section, showing the device of FIG. 3 in a partially open state.
Figure 5:
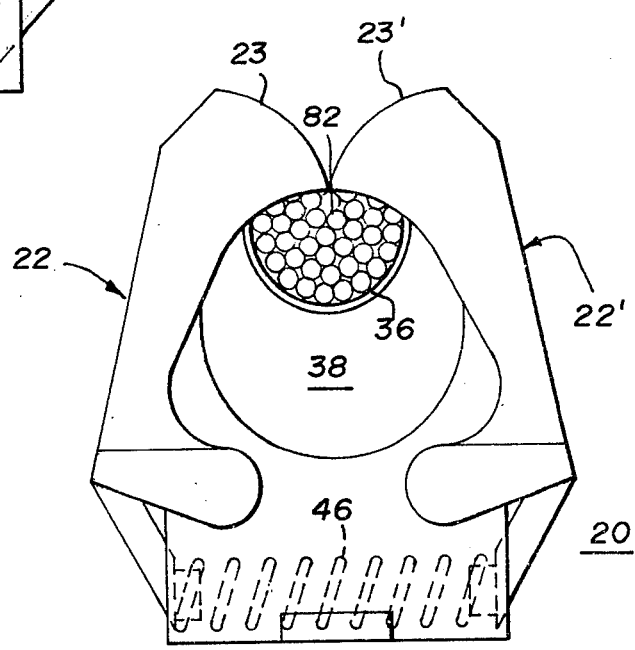
FIG. 5 is a front elevational view of the device of FIG. 3 showing a bundle of wires engaged therewithin.
Figure 11:
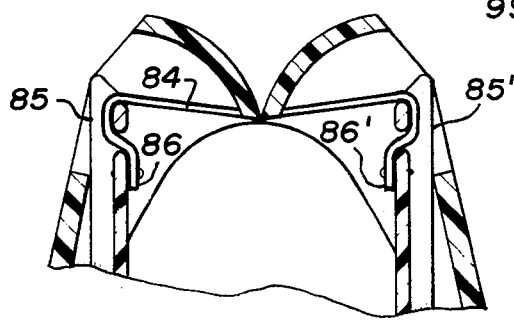
FIG. 11 is a fragmentary front elevational view, partly in section, of a further embodiment of a cable clamp assembly constructed in accordance with the concepts of the invention.

Returning now to FIGS. 1 through 5, the frame member lower portion 30 is provided with pivot means which, as may be more clearly seen in FIG. 2, comprises a pair of pins 78, 78' associated with arm 22' and a further set of similar pins (not shown) associated with arm 22. Arm 22' is provided with pin receiving recesses 80, 80', as is arm 22, for receiving the associated pivot pins therewithin. An alternate arrangement may, of course, be employed wherein pivot pins similar to 78, 78' may be attached to, or molded as part of the arms 22, 22' and pivot pin receiving apertures (not shown) may be formed in the base portion 30 of frame member 32 to receive the pivot pins therewithin. In will of course be readily apparent to those skilled in the art that other alternative arrangements may be similarly employed to permit the aforesaid pivoting action of the arms 22, 22'. Such alternative arrangements may include, for example, a ball-like extension on each of the arms with a suitably contoured socket in the lower portion 30 of the frame member 32 or the converse arrangement, where necessary or desirable. The self-adjusting feature of the cable clamp assembly 20 may be more fully appreciated by referring specifically to FIGS. 3, 4 and 5, which illustrate, in sequence, the manner in which the cable clamp 20 may be employed to accept and retain a bundle of wires such as 82. Initially, the wire bundle 82 is disposed adjacent the valley defined by the convexedly contoured exterior surfaces 23, 23' of arms 22, 22', respectively. The wire bundle 82 is then urged downwardly towards the cable receiving cavity 38 of the cable clamp assembly 20 causing the arms 22, 22' to cam apart, as shown in FIG. 4, thereby exposing a portion of the elastomeric strip 36 which yieldingly deforms under the pressure of the wire bundle 82 so that, as the bundle 82 is forced further into the cable receiving cavity 38, the strip 36 will tend to cradle the wire bundle 82 while the arms 22, 22' are urged together under the influence of the biasing spring 46 to cause the wire bundle 82 to be peripherally encompassed within the inner surfaces of the arms 22, 22' and a portion of the elastomeric strip 36, substantially as shown in FIG. 5. The curve of the exterior surfaces 23, 23' of the arms 22, 22', respectively, is designed to provide a cam angle between a plane drawn tangent to the point of contact of the wire bundle 82 therewith and the associated pivot point 28, 28', respectively, greater than 90°, to insure that each of the arms 22, 22' is cammed outwardly and away from the cable receiving cavity 38 as the wire bundle is urged against the respective surfaces 23, 23'. Although the wire bundle 82 is now securely captivated between the arms 22, 22' and the elastomeric strip 36, it may be rapidly and simply removed from the clamp 20 merely by pulling back on the wire bundle 82 in a direction opposite that in which it was inserted in the cable receiving cavity 38. The arms 22, 22' will then be cammed apart from the inside to permit the wire bundle 82 to be removed from the cable clamp assembly 20. Clamp assembly 20 may be advantageously employed, for example, as in the construction of a wire harness in which individual wires are laid in a predetermined pattern over a lay-out drawing fastened to a support board (not shown). One or more clamp assemblies 20 may be fastened to the board in a preselected position to serve as a guide and retainer for the individual wires laid down along the predetermined pattern. Upon its completion, the wire harness may then be securely tied at predetermined points by the use of a bundling strap or the like and the entire assembly rapidly and conveniently removed from the wire harness board merely by lifting the cable away therefrom releasing the harness from each of the clamp assemblies 20. Although the elastomeric strip 36 is shown in FIGS. 1 through 4 as being formed generally in a continuous loop and disposed peripherally about the cable receiving cavity 38, it may alternatively be formed as shown, for example, in FIG. 11 wherein there is illustrated an elastomeric strip 84 of given length having its ends 86, 86' attached adjacent the free ends of a pair of frame supports 85, 85'. Consequently, an elastomeric strip materially shorter than that required for the embodiment shown in FIG. 1 may be employed in this configuration. Either of the elastomeric strips 36 or 84 may be formed as a single band of predetermined width, or as a plurality of discrete bands in juxtaposed arrangement.

Figure 9:
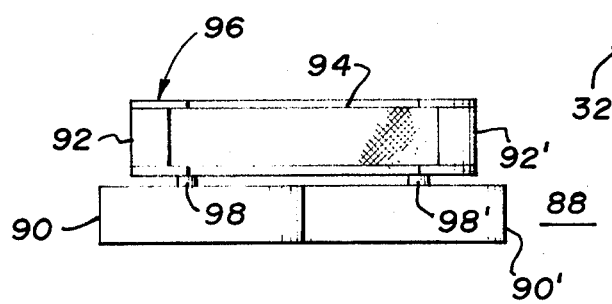
FIGS. 9 and 10 are top plan views of further embodiments of a cable clamp assembly constructed in accordance with the concepts of the invention.

Turning now to FIG. 9 there is shown a further embodiment of a cable clamp assembly 88 constructed in accordance with the concepts of the invention. In this embodiment the interrelationship between the arms and the frame supports are changed somewhat from that shown in the previously described illustrations to provide a pair of pivoting arms 90, 90' situated parallel to and adjacent one side of a pair of upstanding frame supports 92, 92'. Spanning the free ends of the extending supports 92, 92' is a elastomeric strip 94, similar to strip 36, illustrated in FIGS. 1 through 4. The elastomeric strip 94 may, of course, be attached to the frame supports 92, 92' in a manner similar to that illustrated in FIG. 11 and, as described heretofore, may comprise either a single band or, alternatively, a plurality of bands in juxtaposed relationship. The arms 90, 90' are pivotally coupled to frame member 96 at 98, 98' and may, of course, be biased to the closed position by biasing means similarly to that shown in any of the embodiments illustrated in FIGS. 1, 6, 7 and 8. The arms 90, 90', in cooperation with the supports 92, 92', may thus be employed in a manner similar to that described with respect to cable clamp assembly 20 (FIGS. 1 through 4).

Figure 10:
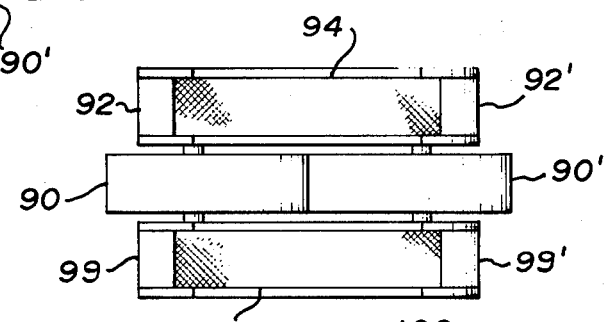

Referring now to FIG. 10 a further pair of supports 98, 98' may be added to the structure illustrated in FIG. 9 to provide a cable clamp assembly 100 in which the pivoting arms 90, 90' are flanked on both sides with frame member supports 92, 92' and 98, 98'. The additional pair of frame member supports 99, 99' is also provided with an elastomeric strip 102 essentially duplicative of strip 94. A wire bundle may thus retain within the clamp assembly 100 and cradle within both the elastomeric strips 94 and 102. This arrangement may be found extremely advantageous where larger sized wire bundles are employed since the length of engagement of the clamp assembly 100 with the wire bundle may be readily increased beyond that provided by the cable clamp 20 without increasing the width either of the arms or the support members thereof. The cable clamp assembly 100 is, of course, cammingly operable in a manner similar to that described theretofore with respect to the assembly 20. That is, by pivotingly displacing the arms 90, 90' to permit the wire bundle to contact, engage, and be cradled by the elastomeric strips 94 and 102 as the cable is urged downwardly into the cable receiving cavity (not shown). The arrangement illustrated in FIG. 10 may, of course, be expanded to provide alternating arms and support members in juxtaposed relation to provide an increased length or support, where necessary or desirable. It may also be noted that two or more cable clamp assemblies similar to cable clamp assembly 20 and 100 may be attached to one another in side-by-side relationship to provide a multiply clamp assembly where, for example, two or more parallel wire harnesses are to be constructed along side one another.

The embodiments of the invention in which an exclusive property or privilege is claimed are defined as follows:

1. A cable clamp assembly comprising: a frame member having a base portion and a pair of spaced upstanding supports, said supports extending from said base portion to define a cable receiving cavity therebetween; a first arm and a second arm arranged in a pair, each of said first and said second arms having an upper portion and a lower portion, said upper portions each having a free end, said lower portion of each of said first and second arms being pivotally coupled to said frame member generally adjacent said frame member base portion; biasing means operatively coupled to said lower portion of each of said first and second arms to cause said free ends of said upper portions thereof to be urged towards one another in contacting engagement to encompass at least a portion of said cable receiving cavity; and an elastomeric strip coupled to said frame member supports and spanning the space therebetween generally adjacent said upper portions of said first and second arms, said first and second arms being movable independently of said elastomeric strip and arranged to pivotingly spread apart and away from said cable receiving cavity to provide access to said elastomeric strip, said elastomeric strip being arranged to receive a cable to provide a cradle thereabout within said frame member cable receiving cavity.

2. A cable clamp assembly as defined in claim 1 wherein said biasing means comprises spring means coupled between said lower portions of said first and second arms.

3. A cable clamp assembly as defined in claim 1 wherein said biasing means comprises spring means coupling said lower portion of each of said first and second arms to said frame member generally adjacent said base portion thereof.

4. A cable clamp assembly as defined in claim 3 wherein said spring means is attached to each of said first and second arm lower portions and cooperatively engages said frame member.

5. A cable clamp assembly as defined in claim 3 wherein said spring means is attached to said frame member and cooperatively engages each of said first and second arm lower portions.

6. A cable clamp assembly as defined in claim 3 wherein said spring means comprises a torsion spring cooperatively coupled to a respective one of each of said first and second arms and said frame member generally adjacent said pivot coupling between each of said first and second arms and said frame member base portion.

7. A cable clamp assembly as defined in claim 1 wherein each of said first and second arms at least partially straddles a respective one of said frame member supports.

8. A cable clamp assembly as defined in claim 1 wherein said first and second arms are disposed adjacent one side of said pair of frame members supports and in generally parallel planar relationship therewith.

9. A cable clamp assembly as defined in claim 8 further comprising an additional pair of spaced, upstanding frame member supports extending from said base portion in generally parallel planar relationship with said first mentioned pair of frame member supports, and an elastomeric strip coupled to said additional pair of frame member supports and spanning the space therebetween generally adjacent said upper portion of said first and second arms, said first and second arms being disposed intermediate said two pair of supports.

10. A cable clamp assembly as defined in claim 1 wherein the exterior surface of said upper portion of each of said first and second arms is convexedly shaped.

11. A cable clamp assembly as defined in claim 1 wherein said elastomeric strip peripherally encompasses said cable receiving cavity in fixed relationship thereto independently of the position of said first and second arms.

12. A cable clamp assembly as defined in claim 1 wherein said elastomeric strip has a given length, the opposing ends of said strip being attached, respectively, to the opposing free ends of said pair of frame member supports.

13. A cable clamp assembly as defined in claim 1 wherein said frame member base portion comprises spaced pin means, and said lower portion of each of said first and second arms comprises an apertured portion encompassing an associated one of said pin means so that each of said first and second arms may pivot thereabout.

14. A cable clamp assembly as defined in claim 1 wherein said biasing means comprises spring means coupled between said lower portions of said first and second arms, each of said first and second arms at least partially straddling a respective one of said frame member supports.

15. A cable clamp assembly as defined in claim 1 wherein said biasing means comprises spring means coupling said lower portion of each of said first and second arms to said frame member generally adjacent said base portion thereof, each of said first and second arms at least partially straddling a respective one of said frame member supports.

16. A cable clamp assembly as defined in claim 1 wherein said biasing means comprises spring means coupled between said lower portions of said first and second arms, and said elastomeric strip has a given length, the opposing ends of said strip being attached, respectively, to the opposing free ends of said pair of frame member supports.

17. A cable clamp assembly as defined in claim 1 wherein said biasing means comprises spring means coupled between said lower portions of said first and second arms, said frame member base portion comprises spaced pin means, and said lower portion of each of said first and second arms comprises an apertured portion encompassing an associated one of said pin means so that each of said first and second arms may pivot thereabout.

* * * * *